United States Patent
Potiagalov

(10) Patent No.: US 9,563,664 B2
(45) Date of Patent: Feb. 7, 2017

(54) SEMANTIC FILTERING IN DATA MATCHING

(71) Applicant: Alexei Potiagalov, Richmond, CA (US)

(72) Inventor: Alexei Potiagalov, Richmond, CA (US)

(73) Assignee: Business Objects Software, Ltd., Dublin (IE)

( * ) Notice: Subject to any disclaimer, the term of this patent is extended or adjusted under 35 U.S.C. 154(b) by 280 days.

(21) Appl. No.: 14/581,246

(22) Filed: Dec. 23, 2014

(65) Prior Publication Data

US 2016/0179809 A1    Jun. 23, 2016

(51) Int. Cl.
*G06F 17/30*    (2006.01)

(52) U.S. Cl.
CPC ............... *G06F 17/30522* (2013.01)

(58) Field of Classification Search
CPC ................................................ G06F 17/30522
See application file for complete search history.

(56) References Cited

U.S. PATENT DOCUMENTS

| | | |
|---|---|---|
| 6,947,933 B2 | 9/2005 | Smolsky et al. |
| 8,051,084 B2 | 11/2011 | Tunkelang et al. |
| 8,065,306 B2 | 11/2011 | Oda et al. |
| 8,280,887 B1 | 10/2012 | Stork et al. |
| 2008/0294673 A1* | 11/2008 | Rupp ................ G06F 17/30415 |
| 2014/0046983 A1* | 2/2014 | Galloway ......... G06F 17/30958 |
| | | 707/798 |
| 2014/0229163 A1* | 8/2014 | Gliozzo ............. G06F 17/2785 |
| | | 704/9 |

OTHER PUBLICATIONS

Sedgwick, Philip, "Pearson's correlation coefficient", Endgames, BMJ 2012;345:e4483 doi: 10.1136/bmj.e4483 (Published Jul. 4, 2012), 2 pages.

Gauthier, Thomas D., "Detecting Trends Using Spearman's Rank Correlation Coefficient", Environmental Forensics (2001) 2, pp. 359-362.

* cited by examiner

*Primary Examiner* — Etienne Leroux
*Assistant Examiner* — Husam T Samara
(74) *Attorney, Agent, or Firm* — Brake Hughes Bellermann LLP

(57) ABSTRACT

A computer-implemented method for finding related datasets includes, for each reference dataset from multiple reference datasets, determining domains and geographies for a user dataset and the reference dataset, obtaining a weighted domain coefficient and a weighted geography coefficient using the determined domains and geographies for the user dataset and the reference dataset, calculating a correlation coefficient between the user dataset and the reference dataset and calculating a semantic filtering coefficient for the user dataset and the reference dataset using the calculated correlation coefficient, the weighted domain coefficient and the weighted geography coefficient.

20 Claims, 4 Drawing Sheets

| domain | agriculture | construction | demographics | economy | education | energy | food | government | healthcare | manufacturing | mass media | mining | recreation | utilities |
|---|---|---|---|---|---|---|---|---|---|---|---|---|---|---|
| agriculture | 1 | 0 | 1 | 1 | 0 | 1 | 1 | 0.5 | 0 | 0 | 0 | 0.3 | 0 | 0.3 |
| construction | 0 | 1 | 1 | 1 | 0 | 0 | 0 | 0.3 | 0 | 0.3 | 0 | 0 | 0.3 | 0 |
| demographics | 0 | 0 | 1 | 1 | 0.5 | 0 | 0 | 0 | 1 | 0 | 0 | 0 | 0 | 0 |
| economy | 1 | 1 | 1 | 1 | 0.3 | 1 | 1 | 1 | 0 | 1 | 0 | 1 | 0 | 0.5 |
| education | 0 | 0 | 1 | 0.5 | 1 | 0 | 0 | 1 | 0 | 0 | 0 | 0 | 0 | 0 |
| energy | 0.3 | 0 | 1 | 1 | 0 | 1 | 0 | 0.5 | 0 | 0.5 | 0 | 1 | 0.3 | 0 |
| food | 1 | 0 | 1 | 1 | 0 | 1 | 1 | 0.5 | 0 | 0 | 0 | 0 | 0 | 0 |
| government | 0 | 0 | 1 | 1 | 0.5 | 0 | 0 | 1 | 0 | 0 | 0 | 0 | 0 | 0 |
| healthcare | 0 | 0 | 1 | 1 | 0 | 1 | 0 | 1 | 1 | 0 | 0 | 0 | 0 | 0 |
| manufacturing | 0 | 0.3 | 1 | 1 | 0 | 1 | 0 | 0.5 | 0 | 1 | 0 | 1 | 0.3 | 0 |
| mass media | 0 | 0 | 1 | 1 | 0.5 | 0 | 0 | 1 | 0 | 0 | 1 | 0 | 0.5 | 0 |
| mining | 0 | 0 | 1 | 1 | 0 | 1 | 0 | 0.5 | 0 | 1 | 0 | 1 | 0 | 0.3 |
| recreation | 0 | 0.3 | 1 | 1 | 0 | 0.5 | 0 | 0.5 | 0 | 0 | 0.3 | 0 | 1 | 0 |
| utilities | 0 | 0 | 1 | 1 | 0 | 0 | 0 | 0.5 | 0 | 0 | 0 | 0 | 0 | 1 |

| Reference Dataset | Country |
|---|---|
| Products of wood, cork, straw and plaiting materials; Builders' joinery and carpentry of wood | Brazil |
| Technicians and equivalent staff, by sex (Total/Female) in FTE and HC: Number of Technicians (Female) in HC | Japan |
| Researchers, by sex (Total/Female) in FTE and HC: Number of researchers in HC | Japan |
| Technicians and equivalent staff, by sex (Total/Female) in FTE and HC: Number of technicians in FTE | Tunisia |
| Researchers, by sex (Total/Female) in FTE and HC: Number of researchers in HC | Madagascar |
| Ratio of girls to boys in primary and secondary education (%) | Cote d'Ivoire |
| Other chemical products; man-made fibres: Preparations for use on the hair | Finland |
| Central government - cash receipts | Jamaica |
| Target 4.A: Reduce by two-thirds, between 1990 and 2015, the under-five mortality rate: Children under five mortality rate per 1,000 live births (UNICEF) | Botswana |
| Enrolment ratios by level of education and gender: Combined Gross Enrolment ratio - primary to tertiary (ISCED 16) GPI | Libya |

450

| Reference Dataset | Country |
|---|---|
| Radio, television and communication equipment and apparatus: Printed circuits | Canada |
| Target 8.B: Address the special needs of the least developed countries: ODA to basic social services, million US$ (OECD) | United States of America |
| Forest: Pulpwood,Round&Split(NC) | United States of America |
| Basic chemicals: Caustic soda | Canada |
| Target 8.B: Address the special needs of the least developed countries: ODA to basic social services, million US$ (OECD) | Canada |
| Technicians and equivalent staff, by sex (Total/Female) in FTE and HC: Number of technicians in FTE | Canada |
| Meat; fish; fruit; vegetables; oils and fats: Oil, corn, crude or refined | Canada |
| Other chemical products; man-made fibres: Preparations for use on the hair | Canada |
| Central government - gross debt | China |
| Radio, television and communication equipment and apparatus: Printed circuits | United States of America |

SEMANTIC FILTERING IN DATA MATCHING

TECHNICAL FIELD

This description relates to semantic filtering in data matching.

BACKGROUND

A user may have a dataset and desire to find other relevant and related datasets. Other relevant and related datasets may enrich the user's dataset and provide analytical insights not possible without such data enrichment. In the process of finding other relevant and related datasets, it is possible that irrelevant and unrelated datasets may be found and included in the results. It may be desirable to eliminate and/or reduce the number of irrelevant and unrelated datasets from the results.

SUMMARY

According to one general aspect, a system for finding related datasets includes at least one processor and a non-transitory computer-readable medium configured to store executable instructions that when executed by the at least one processor are configured to implement a user dataset, one or more reference datasets, a domain weight module, a geography weight module and a semantic filtering module. The domain weight module contains a list of domains having weighted domain coefficients and the geography weight module contains a list of geographies having weighted geography coefficients. For each reference dataset, the semantic filtering module is configured to determine domains and geographies for the user dataset and the reference dataset, obtain a weighted domain coefficient from the domain weight module and a weighted geography coefficient from the geography weight module using the determined domains and geographies for the user dataset and the reference dataset, calculate a correlation coefficient between the user dataset and the reference dataset and calculate a semantic filtering coefficient for the user dataset and the reference dataset using the calculated correlation coefficient, the weighted domain coefficient and the weighted geography coefficient.

In another general aspect, a computer-implemented method for finding related datasets includes, for each reference dataset from multiple reference datasets, determining domains and geographies for a user dataset and the reference dataset, obtaining a weighted domain coefficient and a weighted geography coefficient using the determined domains and geographies for the user dataset and the reference dataset, calculating a correlation coefficient between the user dataset and the reference dataset and calculating a semantic filtering coefficient for the user dataset and the reference dataset using the calculated correlation coefficient, the weighted domain coefficient and the weighted geography coefficient.

In another general aspect, a computer program product is tangibly embodied on a non-transitory computer-readable storage medium and includes executable code that, when executed, is configured to cause at least one processor for each reference dataset from multiple datasets to determine domains and geographies for a user dataset and the reference dataset, obtain a weighted domain coefficient and a weighted geography coefficient using the determined domains and geographies for the user dataset and the reference dataset, calculate a correlation coefficient between the user dataset and the reference dataset and calculate a semantic filtering coefficient for the user dataset and the reference dataset using the calculated correlation coefficient, the weighted domain coefficient and the weighted geography coefficient.

The details of one or more implementations are set forth in the accompanying drawings and the description below. Other features will be apparent from the description and drawings, and from the claims.

BRIEF DESCRIPTION OF THE DRAWINGS

FIG. 3 is a table illustrating an example weighted domain matrix.

FIG. 4 are two tables illustrating example of reference datasets without using semantic filtering and with semantic filtering.

DETAILED DESCRIPTION

This document describes a system and techniques for finding reference datasets that are relevant and related to a user dataset. The system and techniques use a semantic correlation coefficient to determine the relatedness and relevancy between datasets. The semantic correlation coefficient includes accounting for both knowledge domains and geographies of the datasets using weighted values for the domains to indicate a relatedness and relevancy between different domains and different geographies. Reference datasets having a high semantic correlation coefficient relative to the user dataset are selected and presented to the user.

Figure 1:
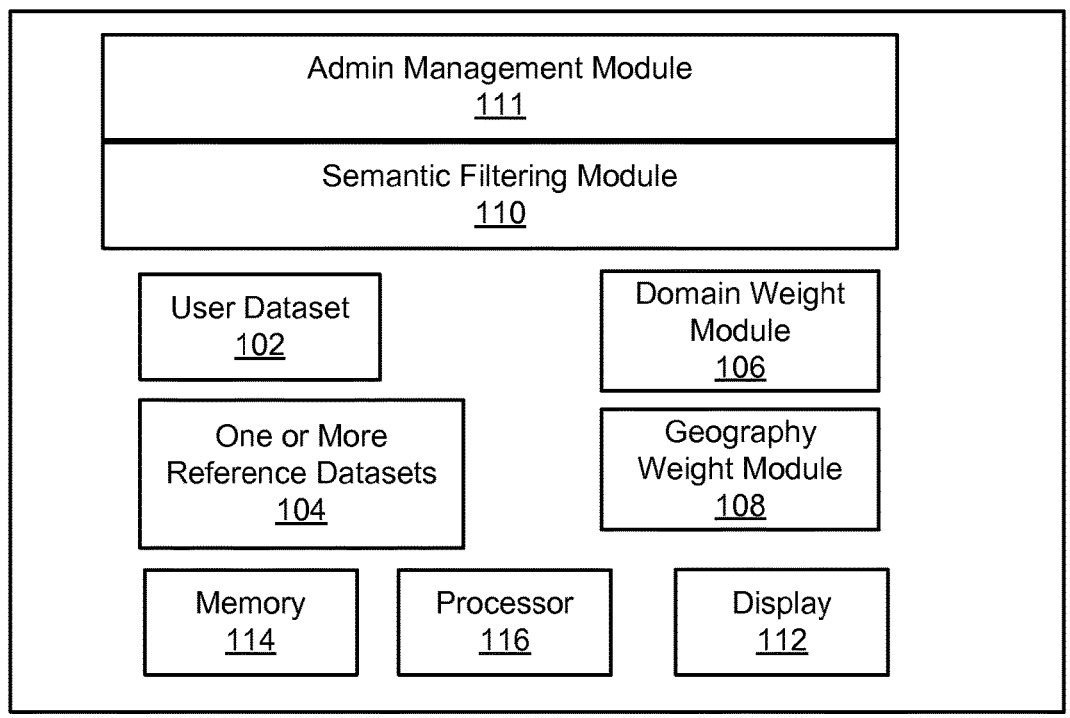
FIG. 1 is a block diagram of a system for finding related datasets.

FIG. 1 is a block diagram of a system 100 for finding related datasets. The system 100 may be implemented on a computing device such as a desktop computer, a server, a laptop computer, a tablet, a smart phone or any other type of computing device. It is understood that the system 100 may be implemented across multiple computing devices. In one example implementation, the system 100 is implemented on a cloud server or application server.

FIG. 1 includes a user dataset 102 and one or more reference datasets 104. One goal of the system 100 is to find the reference datasets 104 that are the most relevant and related to user dataset 102. The user dataset 102 may reside in a database or a file system or other medium appropriate for storing a dataset, including residing in any form of storage or in memory such as, for example, flash memory, random access memory (RAM), read-only memory (ROM), etc. The user dataset 102 may be received from a user using a client device (not shown), where the user dataset 102 is uploaded, for example across a wired and/or wireless network such as the Internet, to the system 100 from the client device. The user dataset 102 may include data in any format and be representative of any type of data including, for instance, time-series data and other types of data from many different types of domains.

The reference datasets 104 may reside in a database or multiple databases and/or in a file system or multiple file systems, including residing in any form of storage or in memory such as, for example, flash memory, RAM, ROM, etc. The reference datasets 104 may include datasets that are publically available such as economic databases, weather-related databases and other various types of publically available databases. The reference datasets 104 also may include private databases that may not be generally available to the public and include data from many different types of domains. The reference datasets 104 may include data in any format and include, for instance, time-series data, and other types of data in different formats.

The system 100 includes a domain weight module 106 and a geography weight module 108. The domain weight module 106 includes a table of a matrix of different domains and a weight that indicates how much a domain influences another domain in the same geography. Referring to FIG. 3, a table 300 illustrates an example matrix of domains and the weighted domain coefficients. The domains appear in both the columns and the rows. The value in the matrix is a weighted domain coefficient that indicates how much one domain influences another domain in the same geography. A weight of 1 indicates a high influence and a weight of 0 indicates no influence. While the example illustrates the weighted domain coefficients in a matrix, it is understood that other data structures may be used to represent the weighted domain coefficients and that the domain weight module 106 may store these other data structures.

Also, it is understood that the list of domains illustrated in FIG. 3 is illustrative only and that the list of domains may include many more domains and sub-domains, where the domains and sub-domains may be in a hierarchical type of listing within the table 300. That is, sub-domains may appear within a particular domain listing and also have a weight associated with the sub-domain as it relates to other domains and sub-domains.

Referring back to FIG. 1, the geography weight module 108 includes a table of a matrix of different geographies and a weight that indicates how much events in one geography affect other geographies. The geographies may be at one or more different levels. In one example, the geographies may be at the country level. In other examples, the geographies may be at the country level and also at other levels including regions, states, counties and cities. In this manner, the geographies may include a hierarchy of geographies and associated weightings that indicates how much events in one geography affect other geographies.

The table of geographies may be similar to the table of domains 300 of FIG. 3, but with the geographic location listed in place of the domain name. The geographies appear in both the columns and rows of the matrix. The value in the matrix is a weighted geography coefficient. A weight of 1 indicates a high influence and a weight of 0 indicates no influence. While the example describes the weighted geography coefficients in a matrix, it is understood that other data structures may be used to represent the weighted geography coefficients and that the geography weight module 108 may store these other data structures.

The system 100 includes a semantic filtering module 110. The semantic filtering module 110 is configured to calculate which of the reference datasets 104 are the most relevant or related to the user dataset 102. The semantic filtering module 110 may find the reference datasets 104 that are relevant to the user dataset 102 by calculating a semantic correlation coefficient for each of the reference datasets 104 relative to the user dataset 102. The reference datasets 104 having the highest semantic correlation coefficient may be determined to be the most relevant to the user dataset 102.

To calculate the semantic correlation coefficient, the semantic filtering module 110 determines the domains and geographies for the user dataset 102 and each of the reference datasets 104. In one implementation, the user dataset 102 and the reference datasets 104 may include metadata that can be used by the semantic filtering module 110 to determine which domains and geographies apply to the datasets. This may be an automated process performed by the semantic filtering module 110. In other examples, the semantic filtering module 110 may use other techniques to determine which domains and geographies apply to the datasets.

For example, an example user dataset may include metadata associated with the user dataset that describes or lists the domains and geographies for that user dataset. In a similar manner, the reference datasets 104 also may include metadata associated with the reference dataset that describes or lists the domain and geographies for the reference datasets.

In some cases, the metadata may not explicitly list the domains and geographies for a dataset; however, the metadata may be used to infer the domains and geographies most closely associated with the datasets. The semantic filtering module 110 may use the metadata as part of an automated process to look up, search and/or match the metadata to domains and geographies and to assign those domains and geographies to the datasets.

Once the semantic filtering module 110 determines the domains and geographies for the user dataset 102 and the reference datasets 104, the semantic filtering module 110, for each of the reference datasets, obtains both a weighted domain coefficient from the domain weight module 106 and a weighted geography coefficient from the geography weight module 108. Since a dataset may be associated with more than one domain and more than one geography, the semantic filtering module 110 selects the highest or maximum weighted domain coefficient and the highest or maximum weighted geography coefficient that may apply.

For example, with reference to table 300 of FIG. 3, the semantic filtering module 110 may use the table 300 to look up the domain weights for a user dataset and each of the reference datasets. If more than one domain is associated with the user dataset and the reference dataset, the semantic filtering module 110 selects the highest coefficient value from the table 300. The semantic filtering module 110 may perform a similar process with respect to selecting the weighted geography coefficient.

The semantic filtering module 110 also calculates a correlation coefficient between the user dataset 102 and each of the reference datasets 104. The semantic filtering module 110 may use any of the correlation coefficient calculation methods including, for example, Pearson and Spearman, to calculate the correlation coefficient. Other methods also may be used to calculate the correlation coefficient. The correlation coefficient is a value that provides an indication of relevancy and relatedness between datasets.

The semantic filtering module 110 calculates the semantic filtering coefficient for each of the reference datasets 104 relative to the user dataset 102 by multiplying the correlation coefficient times the weighted geography coefficient times the weighted domain coefficient. The result is a value for each reference dataset that provides an indication of how related that reference dataset is to the user dataset 102. In this manner, the correlation coefficient is not the only measure being used to determine the relatedness or relevancy between the user dataset and each of the reference datasets.

The semantic filtering module 110 may rank the reference datasets 104 using the semantic filtering coefficient calculated for each reference dataset. The semantic filtering module may present the ranked references datasets for display to a user. In this manner, the use of the weighted domain coefficient and the weighted geography coefficient in addition to the correlation coefficient may provide better results in terms of identifying the most relevant and related reference datasets to the user dataset when compared with results that only use the correlation coefficient. Thus, the results provided to the user using the semantic correlation coefficient may enable the user to identify more relevant datasets to their dataset that may be used to provide analytical insight and other information for the user dataset.

The ranked list of reference datasets may be communicated to a user using a client device over a network. Additionally and/or alternatively, the user may access the ranked list on the system 100 through a network connection for viewing on the user's client device.

In one example implementation, the semantic filtering module 110 may calculate a semantic correlation coefficient for each of the reference datasets relative to each other. This information may be used to identify reference datasets that are relevant to a user dataset 102. For instance, the semantic filtering module 110 may find the most relevant reference dataset to the user dataset by calculating the semantic correlation coefficients between the user dataset and the reference datasets. Then, the semantic filtering module 110 may identify other reference datasets that are highly related to the most relevant reference dataset by using the semantic correlation coefficients that were calculated between the reference datasets.

The system 100 also may include an administrative (admin) management module 111. The admin management module 111 may be configured to provide management functions including features to manually and/or automatically tag datasets with metadata and/or other identifiers to associate the datasets with particular domains and geographies. For example, a user with administrative rights or access may associate the reference datasets 104 with domains and/or geographies using metadata or other information that may be associated with the reference datasets 104.

The system 100 includes at least one memory 114 and at least one processor 116, where the memory 114 may be a non-transitory computer-readable storage medium. Thus, the at least one processor 116 may represent two or more processors executing in parallel, and a non-transitory computer-readable storage medium 114 may represent virtually any non-transitory medium that may be used to store instructions for executing the components of system 100. Multiple processors also may be referred to as multi-core processors or multi-processor core environment. The processor 116 may be a hardware processor, including a micro-processor.

The at least one processor 116 may be configured to execute instructions stored on the computer-readable storage medium 114 that, when executed, cause the at least one processor 116 to implement the domain weight module 106, the geography weight module 108, the semantic filtering module 110 and the admin management module 111. The system 100 also may include a display 112 to enable a user to access the system 100 directly.

Figure 2:
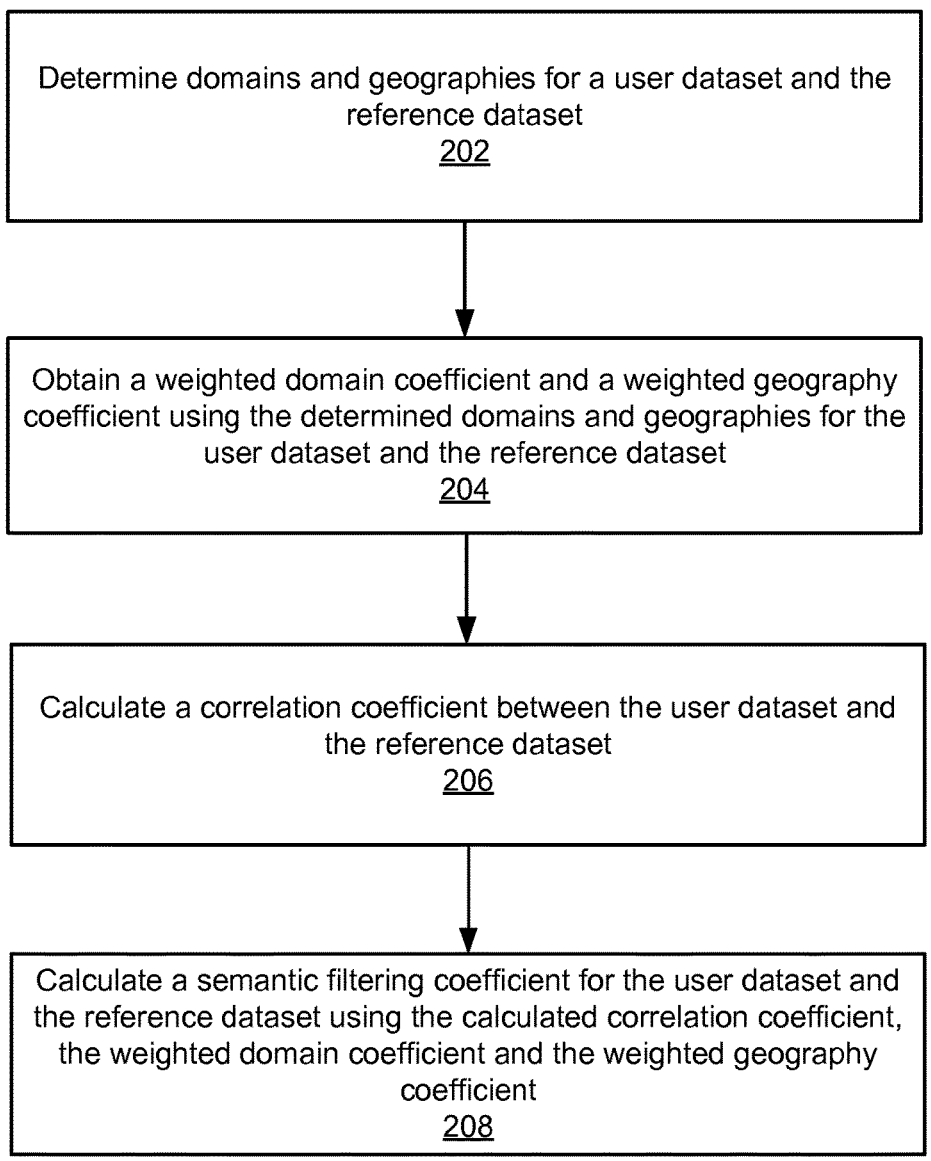
FIG. 2 is a flowchart illustrating example operations of the system of FIG. 1.

Referring to FIG. 2, flowchart illustrates example operations of the system of FIG. 1. A process 200 includes, for each of multiple reference datasets, determining domains and geographies for a user dataset and the reference dataset (202). For example, the semantic filtering module 110 determines domains and geographies for a user dataset and the reference dataset (202).

Process 200 includes obtaining a weighted domain coefficient and a weighted geography coefficient using the determined domains and geographies for the user dataset and the reference dataset (204). For example, the semantic filtering module 110 obtains a weighted domain coefficient and a weighted geography coefficient using the determined domains and geographies for the user dataset and the reference dataset (204). In one example, the semantic filtering module 110 may access a table such as table 300 of FIG. 3 to obtain the weight coefficients.

Process 200 includes calculating a correlation coefficient between the user dataset and the reference dataset (206). For example, the semantic filtering module 110 calculates a correlation coefficient between the user dataset and the reference dataset (206).

Process 200 includes calculating a semantic filtering coefficient for the user dataset and the reference dataset using the calculated correlation coefficient, the weighted domain coefficient and the weighted geography coefficient (208). For example, the semantic filtering module 110 calculates a semantic filtering coefficient for the user dataset and the reference dataset using the calculated correlation coefficient, the weighted domain coefficient and the weighted geography coefficient (208). The semantic filtering coefficient may be calculated by multiplying the calculated correlation coefficient by the weight domain coefficient and the weight geography coefficient.

Referring to FIG. 4, two example tables 400 and 450 of reference dataset results are illustrated. In both example tables, an example user dataset is a dataset containing the United State dollar versus the Canadian dollar exchange rates. For example, the user dataset may include time series data for the exchange rates over a period of time. A user of the user dataset may desire to find other related reference datasets in order to assist in analysing and/or explaining the user dataset.

Table 400 represents a list of reference datasets that were determined to be relevant using only a calculated correlation coefficient. That is, table 400 does not include the use of a semantic filtering coefficient to determine the relevant and related reference datasets. From the list of reference datasets, only two of the reference datasets 405 and 410 are deemed to be relevant matches to the user dataset. The other reference datasets are deemed not to be relevant matches.

Table 450 represents a list of reference datasets that were determined to be relevant using the semantic filtering coefficient. That is, table 450 uses the semantic filtering coefficient to determine the relevant and related reference datasets. From the list of reference datasets, a total of five reference datasets 455, 460, 465, 470 and 475 are deemed to be relevant matches to the user dataset.

Thus, table 450 shows that more relevant matches to a user dataset may be found by using the semantic filtering coefficient instead of using only a correlation coefficient, as shown in table 400.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for finding related datasets, the system comprising:
   at least one processor;
   a non-transitory computer-readable medium configured to store executable instructions that when executed by the at least one processor are configured to implement:
   a user dataset;
   one or more reference datasets;
   a domain weight module containing a list of domains having weighted domain coefficients;
   a geography weight module containing a list of geographies having weighted geography coefficients; and
   a semantic filtering module that, for each reference dataset, is configured to:
      determine domains and geographies for the user dataset and the reference dataset;
      obtain a weighted domain coefficient from the domain weight module and a weighted geography coefficient from the geography weight module using the determined domains and geographies for the user dataset and the reference dataset;
      calculate a correlation coefficient between the user dataset and the reference dataset; and
      calculate a semantic filtering coefficient for the user dataset and the reference dataset using the calculated correlation coefficient, the weighted domain coefficient and the weighted geography coefficient.

2. The system of claim 1 wherein the semantic filtering module is further configured to rank the reference datasets using the semantic filtering coefficient calculated for each reference dataset.

3. The system of claim 2 wherein the semantic filtering module is further configured to present the ranked reference datasets for display to a user.

4. The system of claim 1 wherein the semantic filtering module is configured to calculate the semantic filtering coefficient by multiplying the calculated correlation coefficient by the weighted domain coefficient and the weighted geography coefficient.

5. The system of claim 1 wherein the semantic filtering module is configured to determine the domains and the geographies for the user dataset and the reference dataset using user dataset metadata and reference dataset metadata.

6. The system of claim 1 wherein the semantic filtering module is further configured, for each of the reference datasets, to calculate a semantic correlation coefficient with respect to the other reference datasets.

7. The system of claim 6 wherein the semantic filtering module is configured to use the calculated semantic correlation coefficient calculated between the reference datasets with respect to each other to determine reference datasets that are relevant to the user dataset.

8. A computer-implemented method for finding related datasets including executing instructions stored on a non-transitory computer-readable storage medium, the method comprising for each reference dataset from a plurality of reference datasets:
   determining domains and geographies for a user dataset and the reference dataset;
   obtaining a weighted domain coefficient and a weighted geography coefficient using the determined domains and geographies for the user dataset and the reference dataset;
   calculating a correlation coefficient between the user dataset and the reference dataset; and
   calculating a semantic filtering coefficient for the user dataset and the reference dataset using the calculated correlation coefficient, the weighted domain coefficient and the weighted geography coefficient.

9. The computer-implemented method of claim 8 further comprising ranking the reference datasets using the semantic filtering coefficient calculated for each reference dataset.

10. The computer-implemented method of claim 9 further comprising presenting the ranked reference datasets for display to a user.

11. The computer-implemented method of claim 8 wherein calculating the semantic filtering coefficient comprises multiplying the calculated correlation coefficient by the weighted domain coefficient and the weighted geography coefficient.

12. The computer-implemented method of claim 8 wherein determining the domains and the geographies for the user dataset and the reference dataset comprises determining the domains and the geographies for the user dataset and the reference dataset using user dataset metadata and reference dataset metadata.

13. The computer-implemented method of claim 8 further comprising, for each of the reference datasets, calculating a semantic correlation coefficient with respect to the other reference datasets.

14. The computer-implemented method of claim 13 further comprising using the calculated semantic correlation coefficient calculated between the reference datasets with respect to each other to determine reference datasets that are relevant to the user dataset.

15. A computer program product tangibly embodied on a non-transitory computer-readable storage medium and including executable code that, when executed, is configured to cause at least one processor for each reference dataset from a plurality of reference datasets to:
    determine domains and geographies for a user dataset and the reference dataset;
    obtain a weighted domain coefficient and a weighted geography coefficient using the determined domains and geographies for the user dataset and the reference dataset;
    calculate a correlation coefficient between the user dataset and the reference dataset; and
    calculate a semantic filtering coefficient for the user dataset and the reference dataset using the calculated correlation coefficient, the weighted domain coefficient and the weighted geography coefficient.

16. The computer program product of claim 15 further comprising executable code that, when executed, is configured to cause at least one processor to rank the reference datasets using the semantic filtering coefficient calculated for each reference dataset.

17. The computer program product of claim 16 further comprising executable code that, when executed, is configured to cause at least one processor to present the ranked reference datasets for display to a user.

18. The computer program product of claim 15 wherein the executable code that, when executed, is configured to cause the at least one processor to calculate the semantic filtering coefficient comprises executable code that, when executed, is configured to cause at least one processor to multiply the calculated correlation coefficient by the weighted domain coefficient and the weighted geography coefficient.

19. The computer program product of claim 15 wherein the executable code that, when executed, is configured to cause the at least one processor to determine the domains and the geographies for the user dataset and the reference dataset comprises executable code that, when executed, is configured to cause at least one processor to determine the domains and the geographies for the user dataset and the reference dataset using user dataset metadata and reference dataset metadata.

20. The computer program product of 15 wherein the executable code that, when executed, is configured to cause the at least one processor to calculate a semantic correlation coefficient with respect to the other reference datasets.

* * * * *